United States Patent Office 3,355,729
Patented Nov. 28, 1967

3,355,729
POTENTIAL DIFFERENCE DETECTING ARRANGEMENTS
Ronald Cyril Dayson, Stafford, England, assignor to The English Electric Company Limited, London, England, a British company
Filed Oct. 19, 1964, Ser. No. 404,629
Claims priority, application Great Britain, Oct. 22, 1963, 41,585/63
9 Claims. (Cl. 340—248)

ABSTRACT OF THE DISCLOSURE

A circuit for detecting a voltage exceeding a predetermined magnitude regardless of polarity between two terminals comprising two transistors of opposite conductivity types having all corresponding electrodes connected directly together. Connections are made between the two terminals and the emitters and collectors, respectively, of the transistors, and an indicator lamp is included in one of these connections. The bases of the transistors are connected to a point between the collectors and the terminal to which the collectors are connected. The use of the circuit as a fault indicator in a methane detector is also described.

---

Figure 1:
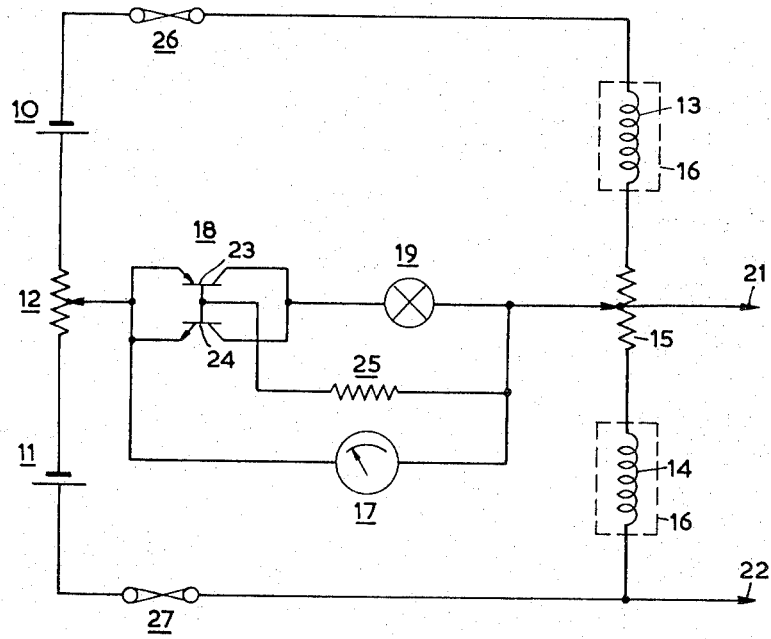

The invention relates to electric circuit arrangements and, in particular, to potential difference detecting arrangements for use therein.

According to one aspect of the invention, a potential difference detecting arrangement for detecting the presence between two points of a potential difference of at least a predetermined magnitude comprises two transistors of opposite conductivity type each having a base electrode, an emitter electrode and a collector electrode, first circuit means interconnecting the base electrodes of the transistors, second circuit means interconnecting the emitter electrodes of the transistors, third circuit means interconnecting the collector electrodes of the transistors, a resistor, fourth circuit means connecting one end of the resistor to the interconnected base electrodes, a first terminal for connection to one of the said points, a second terminal for connection to the other of the said points, fifth circuit means comprising a first connection between the interconnected emitter electrodes and the first terminal and a second connection between the interconnected collector electrodes and the second terminal, a current-activated warning device connected in series with one of the said connections of the fifth circuit means, and sixth circuit means interconnecting the other end of the resistor with the said second connection of the fifth circuit means, the arrangement being such that, in use, when a potential difference of at least the predetermined magnitude exists between two points, one of the transistors, according to the polarity of the potential difference, conducts so as to activate the warning device.

According to another aspect of the invention, an electric circuit arrangement comprising a bridge circuit includes a first pair of junction points and a second pair of junction points and two pairs of series-connected impedances, both pairs of impedances being connected between the first pair of junction points and the connections between the two impedances of each pair of impedances being respectively connected to the second pair of junction points, a potential difference detecting arrangement, as disclosed above, means respectively connecting the said terminals of the potential difference detecting arrangement with the second pair of junction points, and means for applying a voltage source between the first pair of junction points so that one of the transistors of the potential difference detecting arrangement conducts when the said impedance have such relative values that the potential difference between the second pair of junction points has at least the said predetermined magnitude.

Advantageously, in one such electric circuit arrangement for detecting the presence of a combustible gas in an atmosphere, the two impedances of one pair of the said series-connected impedances respectively comprise resistive heating elements whose resistance varies with temperature, one only of the heating elements being coated with a catalyst which, in the presence of the gas to be detected, promotes combustion of the gas on the coated element so as to increase its temperature and alter its resistance, the electric circuit arrangement also including a sensitive detector connected between the said second pair of junction points, the sensitive detector acting to detect development of a potential difference between the second pair of junction points due to combustion of gas on the coated heating element and consequent alteration in resistance of the element, and the said potential difference detecting arrangement acting to provide a warning indication when an open circuit condition in one of the heating elements causes the potential difference between the second pair of junction points to have at least the said predetermined magnitude.

Advantageously, in another such electric circuit arrangement for detecting the presence of a combustible gas in an atmosphere, the two impedances of one pair of the said series-connected impedances respectively comprise resistive heating elements, one only of the heating elements being coated with a catalyst which in the presence of the gas to be detected promotes combustion of the gas on the coated element so as to increase its temperature, the electric circuit arrangement including two similar thermocouple arrangements each of which is mounted adjacent to a respective heating element so as to be heated thereby and a sensitive measuring device connected to the two thermocouple arrangements for measuring the difference between their thermo-electric E.M.F.'s occurring due to combustion of gas on the coated heating element, causing consequent additional heating of one of the thermocouple arrangements, the potential difference detecting arrangement acting to provide a warning indication when an open circuit condition in one of the heating elements causes the potential difference between the second pair of junction points to have at least the said predetermined magnitude.

In an embodiment of the invention, the gas to be detected is methane and the catalyst is platinum.

Figure 2:
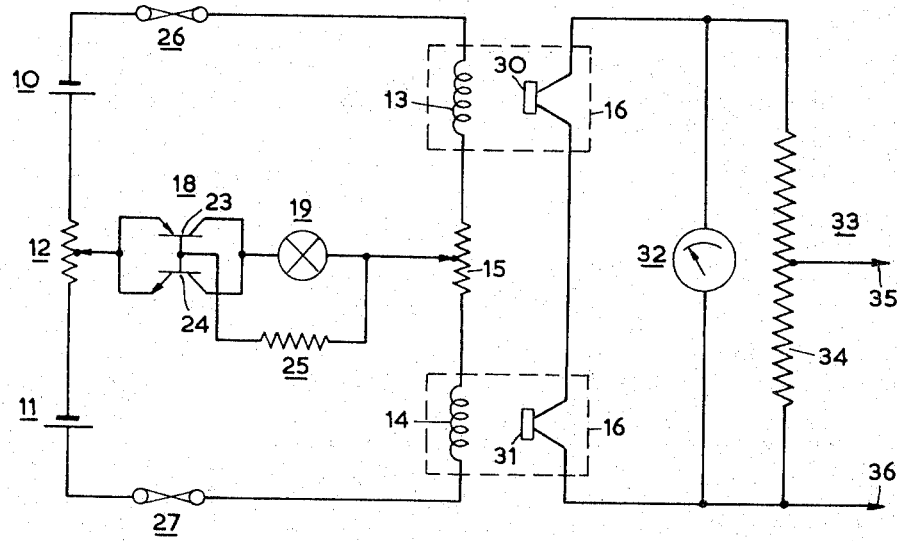

Two forms of electric circuit arrangement embodying the invention will now be described by way of example and with reference to the accompanying drawings in which:

FIG. 1 shows a circuit arrangement for use in the detection of the presence of methane in an atmosphere; and FIG. 2 shows an alternative circuit arrangement for the same purpose.

Referring to FIG. 1, two batteries 10 and 11 are connected in series with a resistor 12 for energising two platinum resistive heating elements 13 and 14 connected in series through a resistor 15. The platinum elements 13 and 14 are nominally identical and at any given temperature have nominally the same resistance. The element 13, however, is activated by having the wire from which it is constructed coated with particles of a substance including platinum. When the element 13 is surrounded by an atmosphere containing methane gas, the platinum in the substance coated on the element 13 acts as a catalyst and promotes combustion of the methane thus raising the temperature of the element 13 and hence its resistance. The element 14 is unactivated. Both elements are enclosed in similar porous containers 16 which allow free diffusion of the atmosphere. Between adjustable tappings on the resistors 12 and 15 a sensitive meter 17 is connected. In parallel with the meter 17 a transistor circuit 18, in series with a lamp 19, is connected. The purpose of the circuit 18 and the lamp 19 will be explained below.

In use, the elements 13 and 14 in the container 16 are exposed to the atmosphere. If no methane is present, both the elements 13 and 14 will have the same temperature and resistance and there will be no potential difference between the tappings of the resistors 12 and 15. The positions of the tappings may be adjusted to overcome any slight inequality between the characteristics of the elements 13 and 14. If methane is present in the atmosphere, however, the above mentioned catalytic action will take place on the surface of the element 13 raising its temperature and resistance. The element 14, not being coated with the catalyst, will not be affected by the methane and its temperature and resistance will not be directly affected by the methane. The increased resistance of the element 13 will however reduce the current through the element 14 and hence its resistance. The effect of the presence of methane therefore, is that a potential difference will be developed between the tappings on the resistors 12 and 15. The meter 17 will indicate the amount of this potential difference which is related to the difference in the resistance of the two elements 13 and 14 and hence to the concentration of methane in the atmosphere. Normal ambient temperature changes will affect both elements 13 and 14 equally and hence will not alter the meter reading. The potential of the tapping on the resistor 15 may also be fed to an amplifier (not shown) by means of connections 21 and 22 and, after amplification, used to operate a warning lamp indicating a high concentration of methane. The circuit arrangement as so far described is generally similar to the methane detection circuit described in our United States patent application Ser. No. 156,011 filed on Nov. 30, 1961 (Thomas Henry Palmer) and the amplifier may be as described therein.

The circuit 18 and the lamp 19 provide an indication should one or other of the elements 13 and 14 fail. The circuit 18 comprises a p.n.p. transistor 23 and an n.p.n. transistor 24 both having their base electrodes connected together and through a resistor 25 to the tapping on the resistor 15. The collector electrodes of both transistors are connected together to the lamp 19 and the emitter electrodes of both transistors are connected together to the tapping on the resistor 12. Under normal operation when both elements 13 and 14 have the same resistance, the potential of all electrodes of the transistors is the same and the transistors are cut-off permitting no flow of current to the lamp 19. If now, the element 13 for example, fails, a large potential difference will develop between the tappings on resistors 12 and 15 causing the base and collector electrodes of the transistors 23 and 24 to become positive with respect to their emitter electrodes. Hence the transistor 24 will conduct allowing current to flow through the lamp 19 giving an indication that an element has failed. The transistor 23 remains cut-off. If the element 14 fails instead of the element 13, the base and collector electrodes of the transistors will become negative with respect to their emitter electrodes causing transistor 23 to conduct, again allowing the current to flow to the lamp 19. Transistor 24 remains cut-off. The value of the resistor 25 is selected so that when either of the transistors is conducting, the transistor is in its lowest resistance or "bottomed" state. Under normal conditions when methane is present, the potential difference developed between the tappings on the resistors 12 and 15 is too small to cause either transistor to conduct to an extent sufficient to allow the lamp 19 to light. The transistor circuit 18 thus normally prevents flow of current to the lamp 19, but in the event of a failure of an element, provides a very low resistance path allowing the flow of current to the lamp.

Fuses 26 and 27 protect the resistor 12 from damage in the event of a short circuit.

FIG. 2 shows a circuit arrangement having some components similar to components in the circuit of FIG. 1 and these parts are similarly referenced. The elements 13 and 14 however, are used to heat similar thermocouples 30 and 31, the element 13, that is, the element activated with the above mentioned catalytic substance, heating the thermocouple 30 and the unactivated element 14 heating the thermocouple 31. The thermocouples are connected so that their thermo-electric E.M.F.'s oppose one another and are connected across a millivolt meter 32 and a resistor 33 having an adjustable tapping.

In use, the elements 13 and 14 in the container 16 are exposed to the atmosphere. If no methane is present, both elements will be at the same temperature and hence the two thermocouples will develop equal and opposite thermo-electric E.M.F.'s and the pointer of the meter 37 will not be deflected. If, however, methane is present, the activated element 13 will attain a higher temperature than the unactivated element 14 and hence the thermocouple 30 will develop more thermo-electric E.M.F. than the thermocouple 31. The pointer of the meter 32 will therefore be deflected to an extent depending on the concentration of methane in the atmosphere. In this circuit, the elements 13 and 14 need not be constructed from wire, the resistance of which varies with temperature. If however, the elements are constructed from a wire the resistance of which increases with temperature, then the increase in temperature of the element 13 will cause a fall in current through the element 14 accentuating the difference in the thermo-electric E.M.F.'s developed by the two thermocouples. If desired, the potential developed across the portion 34 of the resistor 33 when methane is present may be fed to an amplifier (not shown) by means of connections 35 and 36 and after amplification used to operate a warning lamp indicating a high concentration of methane in the atmosphere. The circuit arrangement as so far described is similar to the methane detection circuit described in our co-pending United States patent application Serial No. 173,761 filed on February 16, 1962 (Thomas Henry Palmer) and the amplifier may be as described therein.

The circuit arrangement of FIG. 2 also incorporates the transistor circuit 18 and the lamp 19 shown in FIG. 1. As before, these provide a warning indication if one or other of the elements 13 and 14 fails, and the circuit 18 operates in a manner similar to that described with reference to FIG. 1.

The circuit arrangements may be modified by reversing the connections of the transistor circuit 18; that is, by connecting the collector electrodes of the transistors to the tapping on the resistor 12 instead of to the lamp 19, by connecting the emitter electrodes to the lamp 19 instead of to the resistor 12, and by connecting the base electrodes together and through the resistor 25 to the tapping on the resistor 12 instead of to the resistor 15.

What I claim as my invention and desire to secure by Letters Patent, is:

1. A potential difference detecting arrangement for detecting the presence, between first and second terminals, of a potential difference of at least a predetermined magnitude regardless of polarity, comprising: first and second transistors of opposite conductivity types, each having a base electrode, an emitter electrode, and a collector electrode, corresponding electrodes of the two transistors being connected directly together; a series circuit connected between said terminals and including connection means connecting the emitter electrodes of the transistors to the first terminal and the collector electrodes of the transistors to the second terminal; indicator means included in said connection means; and base circuit means for connecting the bases of the transistors to a point in said series circuit between the collectors of the transistors and said second terminal.

2. A potential difference detecting arrangement according to claim 1, wherein said base circuit means includes a resistor.

3. A potential difference detecting arrangement according to claim 1, wherein said indicator means is connected between the collectors of the transistors and said point in said series circuit.

4. A potential difference detecting arrangement according to claim 1, wherein said indicator means is a lamp.

5. An electric circuit arrangement comprising a bridge circuit including a first pair of junction points and a second pair of junction points and two pairs of series-connected impedances, both pairs of impedances being connected between the first pair of junction points and the connections between the two impedances of each pair of impedances being respectively connected to the second pair of junction points, a potential difference detecting arrangement according to claim 1, means respectively connecting the said terminals of the potential difference detecting arrangement with the second pair of junction points and means for applying a voltage source between the first pair of junction points so that one of the transistors of the potential difference detecting arrangement conducts when the said impedances have such relative values that the potential difference between the second pair of junction points has at least the said predetermined magnitude.

6. An electric circuit arrangement according to claim 5 and for detecting the presence of a combustible gas in an atmosphere in which the two impedances of one pair of the said series-connected impedances respectively comprise resistive heating elements whose resistance varies with temperature, one only of the heating elements being coated with a catalyst which, in the presence of the gas to be detected, promotes combustion of the gas on the coated element so as to increase its temperature and alter its resistance, the electric circuit arrangement also including a sensitive detector connected between the said second pair of junction points, the sensitive detector acting to detect development of a potential difference between the second pair of junction points due to combustion of gas on the coated heating element and consequent alteration in resistance of the element, and the said potential difference detecting arrangement acting to provide a warning indication when an open circuit condition in one of the heating elements causes the potential difference between the second pair of junction points to have at least the said predetermined magnitude.

7. An electric circuit arrangement according to claim 5 and for detecting the presence of a combustible gas in an atmosphere, in which the two impedances of one pair of the said series-connected impedances respectively comprise resistive heating elements, one only of the heating elements being coated with a catalyst which in the presence of the gas to be detected promotes combustion of the gas on the coated element so as to increase its temperature, the electric circuit arrangement including two similar thermocouple arrangements each of which is mounted adjacent to a respective heating element so as to be heated thereby and a sensitive measuring device connected to the two thermocouple arrangements for measuring the difference between their thermo-electric E.M.F.'s occurring due to combustion of gas on the coated heating element, causing consequent additional heating of one of the thermocouple arrangements, the potential difference detecting arrangement acting to provide a warning indication when an open circuit condition in one of the heating elements causes the potential difference between the second pair of junction points to have at least the said predetermined magnitude.

8. An electric circuit arrangement according to claim 7 in which the gas to be detected is methane and the catalyst is platinum.

9. An electric circuit arrangement according to claim 6, in which the gas to be detected is methane and the catalyst is platinum.

References Cited

UNITED STATES PATENTS

| 2,891,195 | 6/1959 | Smyth | 340—331 X |
| 2,907,932 | 10/1959 | Patchell | 307—88.5 |
| 3,233,233 | 2/1966 | Palmer | 340—237 |
| 3,251,654 | 5/1966 | Palmer | 340—237 X |

NEIL C. READ, *Primary Examiner.*

D. MYER, *Assistant Examiner.*